(12) United States Patent
Taverner et al.

(10) Patent No.: US 9,046,389 B2
(45) Date of Patent: Jun. 2, 2015

(54) TIME DELAY COMPENSATION FOR OPTICAL WAVEGUIDES USING A BIDIRECTIONAL WAVELENGTH SCAN

(71) Applicant: WEATHERFORD/LAMB, INC., Houston, TX (US)

(72) Inventors: Domino Taverner, Delray Beach, FL (US); Zhuang Wang, Wallingford, CT (US)

(73) Assignee: WEATHERFORD/LAMB, INC., Houston, TX (US)

( * ) Notice: Subject to any disclaimer, the term of this patent is extended or adjusted under 35 U.S.C. 154(b) by 0 days.

(21) Appl. No.: 14/076,766

(22) Filed: Nov. 11, 2013

(65) Prior Publication Data

US 2014/0341501 A1    Nov. 20, 2014

Related U.S. Application Data

(60) Provisional application No. 61/824,274, filed on May 16, 2013.

(51) Int. Cl.
*G02B 6/34* (2006.01)
*G01D 5/353* (2006.01)
*G01L 1/24* (2006.01)
*G01K 11/32* (2006.01)
*G02B 6/293* (2006.01)

(52) U.S. Cl.
CPC ............ *G01D 5/35354* (2013.01); *G01L 1/246* (2013.01); *G01D 5/353* (2013.01); *G01K 11/3206* (2013.01); *G02B 6/29319* (2013.01); *G01D 5/35383* (2013.01)

(58) Field of Classification Search
CPC ..... G02B 6/29319; G01L 1/246; G01D 5/353; G01D 5/35354; G01K 11/3206
USPC .............................................. 385/37; 398/108
See application file for complete search history.

(56) References Cited

U.S. PATENT DOCUMENTS

| 8,379,297 | B2 | 2/2013 | Taverner |
| 8,494,322 | B2 | 7/2013 | Kersey et al. |
| 2007/0280703 | A1* | 12/2007 | Taverner et al. ............. 398/195 |
| 2009/0290160 | A1 | 11/2009 | Taverner |

* cited by examiner

Primary Examiner — Ryan Lepisto
(74) Attorney, Agent, or Firm — Patterson & Sheridan, LLP

(57) ABSTRACT

Methods and apparatus for accurately determining wavelength by compensating a time delay using a bidirectional wavelength scan are provided. One example method generally includes introducing first wavelength-swept light into an optical waveguide according to a first sweep function having a first wavelength sweep direction; interrogating one or more optical elements, having characteristic wavelengths, with the first wavelength-swept light to produce a first set of optical signals, wherein the optical elements are disposed along the optical waveguide; introducing second wavelength-swept light into the optical waveguide according to a second sweep function having a second wavelength sweep direction, wherein the second wavelength sweep direction is opposite the first wavelength sweep direction; interrogating the optical elements with the second wavelength-swept light to produce a second set of optical signals; and determining a parameter associated with at least one of the optical elements based on the first and second sets of optical signals.

26 Claims, 6 Drawing Sheets

TIME DELAY COMPENSATION FOR OPTICAL WAVEGUIDES USING A BIDIRECTIONAL WAVELENGTH SCAN

CROSS-REFERENCE TO RELATED APPLICATIONS

This application claims benefit of U.S. Provisional Patent Application Ser. No. 61/824,274, filed May 16, 2013 and entitled "TIME DIVISION MULTIPLEXING (TDM) AND WAVELENGTH DIVISION MULTIPLEXING (WDM) FAST-SWEEP INTERROGATOR," which is herein incorporated by reference.

BACKGROUND OF THE INVENTION

1. Field of the Invention

Embodiments of the present invention generally relate to optical interrogation and, more particularly, to techniques and apparatus for accurately determining a characteristic wavelength of an optical component when using swept wavelengths.

2. Description of the Related Art

Many optical components have a characteristic wavelength that may be found by interrogating the optical component with an optical source capable of producing light at various wavelengths over a fixed range or bandwidth. For example, Bragg gratings (typically formed by photo-induced periodic modulation of the refractive index of an optical waveguide core) are highly reflective to light having wavelengths within a narrow bandwidth centered at a wavelength generally referred to as the Bragg wavelength. Because light having wavelengths outside this narrow bandwidth is passed without reflection, Bragg wavelengths can be determined by interrogating a Bragg grating with a light source swept across a bandwidth that includes the Bragg wavelength and monitoring the reflected optical power spectrum at a receiver unit. Because Bragg wavelengths are dependent on physical parameters, such as temperature and strain, Bragg gratings can be utilized in optical sensor systems to measure such parameters.

In these and a wide range of other types of optical systems, the measurement of a characteristic wavelength of an optical component to great accuracy (and/or with great repeatability) is important to system performance. For some techniques, the measurement of characteristic wavelength may be determined using a wavelength sweep technique, where light introduced into the system (e.g., into an optical waveguide) is varied across a range of wavelengths. The introduced light is transmitted down the waveguide and a portion of this light may be reflected back by a Bragg grating if the wavelength of the transmitted light matches the Bragg grating's characteristic wavelength. If the rate of the sweep, the length of the waveguide between the optical source and the Bragg grating, and the index of refraction of the waveguide's core are known, the characteristic wavelength of the reflected light, and thus of the Bragg grating, may be determined based on a time at which a reflection peak is received (i.e., the round-trip time for light introduced into the system to interrogate the Bragg gratings and return to a receiver unit). However, light traveling in a waveguide experiences a time delay depending on the length and the index of refraction of the waveguide. Accurate determination of the time delay can increase characteristic wavelength measurement repeatability and accuracy.

Accordingly, techniques and apparatus for accurately determining the time delay of reflected signals in an interrogation system are desirable.

SUMMARY OF THE INVENTION

Embodiments of the present invention generally provide methods and apparatus for determining a time delay using a bidirectional wavelength scan in an effort to accurately determine the characteristic wavelength, thereby effectively compensating for the time delay and avoiding erroneous wavelength shifts.

One embodiment of the present invention is a method for optical interrogation. The method generally includes introducing first wavelength-swept light into an optical waveguide according to a first sweep function having a first wavelength sweep direction; interrogating one or more optical elements, having characteristic wavelengths, with the first wavelength-swept light to produce a first set of optical signals, wherein the optical elements are disposed along the optical waveguide; introducing second wavelength-swept light into the optical waveguide according to a second sweep function having a second wavelength sweep direction, wherein the second wavelength sweep direction is opposite the first wavelength sweep direction; interrogating the one or more optical elements with the second wavelength-swept light to produce a second set of optical signals; and determining a parameter associated with at least one of the optical elements based on the first and second sets of optical signals.

Another embodiment of the present invention provides an apparatus for optical interrogation. The apparatus generally includes an optical waveguide; one or more optical elements disposed along the optical waveguide, the optical elements having characteristic wavelengths; an optical source; and at least one processor. The optical source is typically configured to introduce first wavelength-swept light into the optical waveguide according to a first sweep function having a first wavelength sweep direction to interrogate the one or more optical elements to produce a first set of optical signals; and to introduce second wavelength-swept light into the optical waveguide according to a second sweep function having a second wavelength sweep direction to interrogate the one or more optical elements to produce a second set of optical signals, wherein the second wavelength sweep direction is opposite the first wavelength sweep direction. The at least one processor is typically configured to determine a parameter associated with at least one of the optical elements based on the first and second sets of optical signals.

Yet another embodiment of the present invention provides an apparatus for optical interrogation. The apparatus generally include means for introducing first wavelength-swept light into an optical waveguide according to a first sweep function having a first wavelength sweep direction; means for interrogating one or more optical elements, having characteristic wavelengths, with the first wavelength-swept light to produce a first set of optical signals, wherein the optical elements are disposed along the optical waveguide; means for introducing second wavelength-swept light into the optical waveguide according to a second sweep function having a second wavelength sweep direction, wherein the second wavelength sweep direction is opposite the first wavelength sweep direction; means for interrogating the one or more optical elements with the second wavelength-swept light to produce a second set of optical signals; and means for determining a parameter associated with at least one of the optical elements based on the first and second sets of optical signals.

Yet another embodiment of the present invention is a computer program product. The computer program product generally includes a computer-readable storage device having instructions executable to introduce first wavelength-swept light into an optical waveguide according to a first sweep function having a first wavelength sweep direction; to interrogate one or more optical elements, having characteristic wavelengths, with the first wavelength-swept light to produce a first set of optical signals, wherein the optical elements are disposed along the optical waveguide; to introduce second wavelength-swept light into the optical waveguide according to a second sweep function having a second wavelength sweep direction, wherein the second wavelength sweep direction is opposite the first wavelength sweep direction; to interrogate the one or more optical elements with the second wavelength-swept light to produce a second set of optical signals; and to determine a parameter associated with at least one of the optical elements based on the first and second sets of optical signals.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention provide for determining a time delay using a two-way wavelength scan in an effort to accurately determine a characteristic wavelength of an optical component, thereby effectively compensating for the time delay and avoiding a wavelength shift error.

For some embodiments, time-delay compensation may involve varying wavelengths by performing a two-way wavelength sweep. For example, a first sweep may be performed in a first, forward direction and a second sweep in a second, reverse direction to interrogate a set of optical elements. Signals may be received from optical elements of the set at a first time and a second time, corresponding to light reflected from the first and second sweeps. The time delay for signals from any one of the optical elements of the set may most likely be the same in both sweep directions because neither the length of the fiber, nor the characteristic wavelength (or more specifically, the parameter being sensed by the optical element) should have changed between the two sweeps. Therefore, the received signals may be compensated using the time delay to accurately determine the wavelength.

For some embodiments, compensating for the time delay may include setting up a system of two equations using the time delay and equating the wavelength for the received signal from the first and second sweep, where the time delay and the wavelength are unknown.

Embodiments of the present invention may be applied in a number of different sensing applications, including, but not limited to, industrial applications, downhole applications (e.g., in wellbore sensing applications), and subsea applications (e.g., ocean bottom seismic sensing applications).

An Example Optical Sensor System

Figure 1:
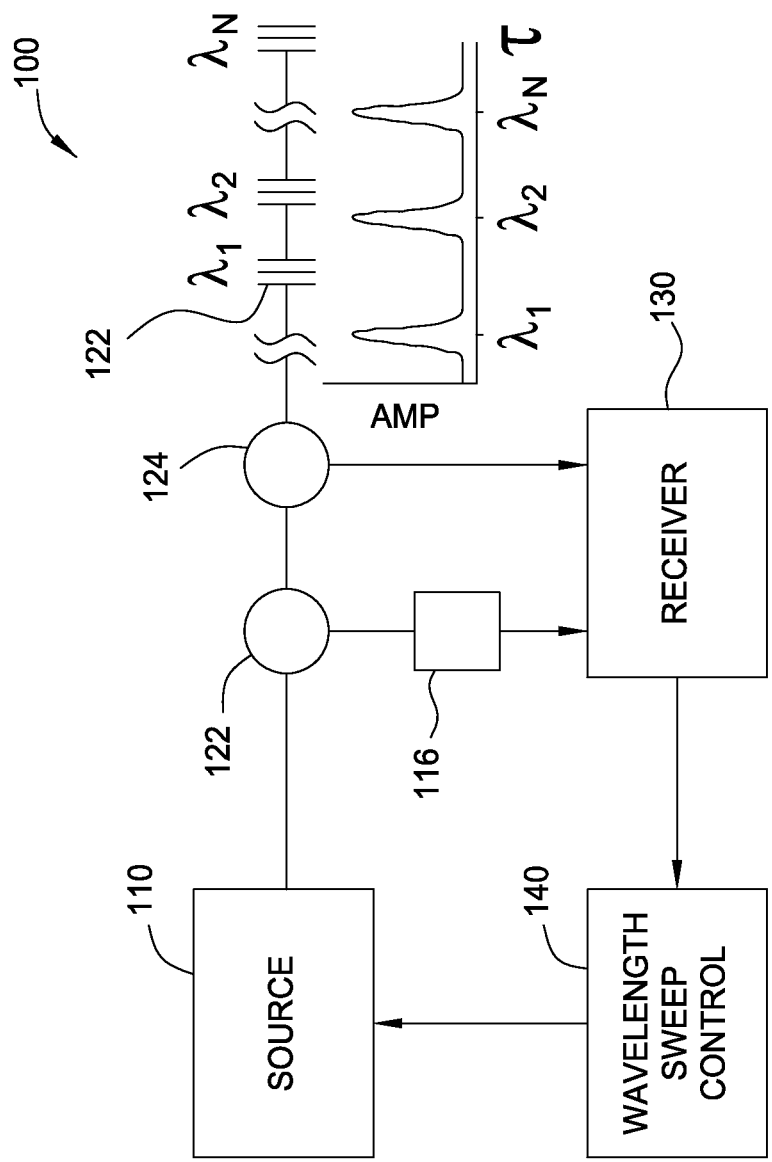
FIG. 1 illustrates an example reflective optical sensor system with wavelength sweep control, in accordance with embodiments of the present invention.

FIG. 1 illustrates an exemplary optical sensor system 100 utilizing wavelength sweep control in accordance with one embodiment of the present invention. As illustrated, the system 100 may include a swept-wavelength optical source 110, one or more reflective optical elements 122 having one or more spectral features of interest (e.g., a characteristic wavelength), and a sweep control unit 140.

The swept-wavelength optical source 110 produces optical radiation at wavelengths and over wavelength ranges (bandwidths) under the control or influence of the sweep control unit 140. The optical elements 122 may be interrogated with optical radiation from the optical source 110 that is swept across a spectral range including the spectral features of interest. The optical elements 122 may be sensitive to parameters (e.g., temperatures, pressures and strain) that effect the attenuation of particular wavelengths of light reflected from the elements 122 in a known manner.

Figure 2:
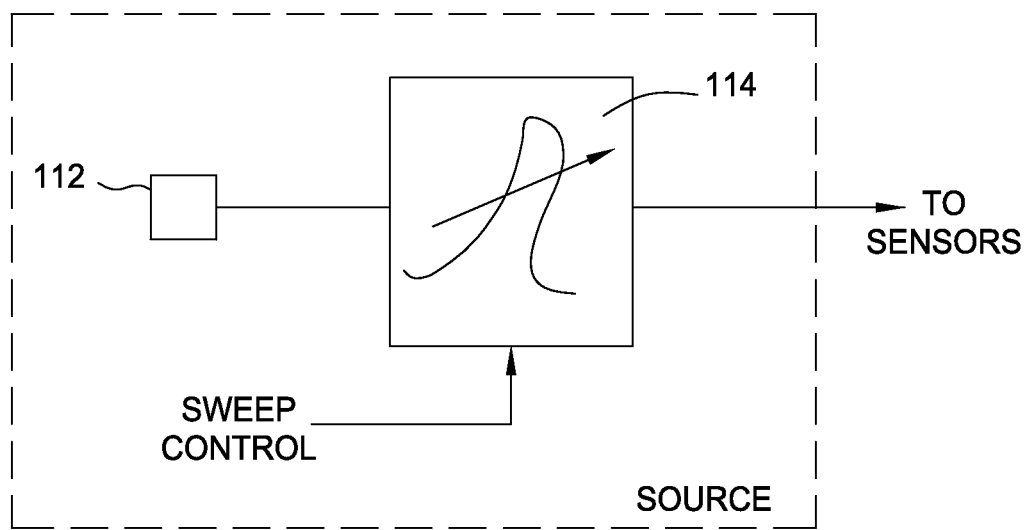
FIG. 2 illustrates an example wavelength sweeping optical source utilizing a tunable filter, in accordance with embodiments of the present invention.

As illustrated in FIG. 2, one embodiment of the optical source 110 may include a broadband source 112 and a tunable filter 114 that may be controlled by the sweep control unit 140. For example, the sweep control unit 140 may control the tunable filter 114 to adjust a wavelength range (or band) to pass with little or no attenuation while blocking wavelengths outside the range. For other embodiments, the optical source 110 may include a light source that can be controlled to generate optical signals of different wavelengths, such as a tunable laser.

For some embodiments, an amplified spontaneous emission (ASE) source may be utilized as the optical source 110 for interrogating the optical elements. Spontaneous emission can occur in an optical fiber when electrons in an upper energy level decay to a lower energy level, spontaneously emitting photons in all directions. Some of these photons are emitted in a direction falling within the numerical aperture of the fiber such that these particular photons are captured and guided by the fiber. In a doped optical fiber, the captured photons from the initial spontaneous emission may then interact with dopant ions and consequently be amplified by stimulated emission, hence the term "amplified spontaneous emission." Accordingly, ASE may be considered as light, produced by spontaneous emission, that has been optically amplified by the process of stimulated emission in a gain medium. The ASE may be used with a tunable filter and amplifier.

Referring back to FIG. 1, the spectral feature of the light reflected from the reflective optical elements 122, such as fiber Bragg gratings (FBGs), is dependent upon a sensed parameter. Each optical element 122 may be interrogated by sweeping across a corresponding wavelength range chosen to contain the characteristic wavelength λ, accounting for the maximum deviations in center wavelengths (areas of peak reflection) expected over the entire range of measured parameters and over time. During this interrogation, the receiver 130 may monitor response signals in order to make characteristic wavelength determinations.

The receiver 130 may include any suitable combination of optical, opto-electronic, and electronic components to process light signals reflected back from the optical elements 122. Thus, the receiver 130 may be able to generate information about the corresponding parameters, based on the spectral information extracted from the received light. The receiver 130 may include any suitable combination of components that converts optical signals to electrical signals, integrates, filters and produces characteristic wavelength determinations. As an example, for one embodiment, the receiver may include an optical PIN diode (e.g., a diode with a wide, lightly doped "near" intrinsic semiconductor region between a p-type semiconductor region and an n-type semiconductor region), transimpedance amplifier, analog filter, analog-to-digital converter, digital filter and processing unit (e.g., an embedded processor, industrial or personal computer) for wavelength determination.

As illustrated, the sweep control unit 140 may receive, as input, one or more signals from one or more points in the receiver 130 and, in response, may output signals that influence the sweep of the optical source 110. Examples of typical parameters that the sweep control unit may influence include, but are not limited to, source wavelength, source wavelength sweep range, sweep rate, and/or source optical output power. These influences may include discontinuous or continuous changes in such parameters, for example, multiple sweep bands. The sweep control unit signals can influence a sweep as it is in progress and/or influence future sweeps.

The sweep control unit 140 may be implemented using any suitable processing logic, such as an embedded controller, a programmable logic controller (PLC), or a personal computer (PC). While shown as a separate component in the Figures, for some embodiments, the sweep control unit 140 may be integrated into, or be an integral function of the receiver 130, source 110, and/or both.

Interrogating optical signals from the source 110 may be directed to the optical elements 122 via a bidirectional coupler 124 that also directs reflected response signals to the receiver 130. A splitter 126 may also direct a portion of the interrogating optical signals to a reference element 116, allowing the receiver 130 to monitor optical signals produced by the optical source 110 (e.g., the actual wavelength and power).

As a practical matter, the number of optical elements 122 (e.g., Bragg gratings) that can be used in a single interrogation system is limited by the ability of the interrogating instrument to distinguish between the optical elements. Wavelength division multiplexing (WDM) and time division multiplexing (TDM) have been used to distinguish between Bragg gratings by wavelength and time, respectively.

The reflective optical elements 122 may have various characteristic wavelengths $\lambda_1$ to $\lambda_N$ for WDM, where N is the maximum number of discrete characteristic wavelengths in an optical waveguide. Furthermore, characteristic wavelengths of the reflective optical elements 122 may be repeated one or more times on the same optical fiber, thereby implicating TDM, as well. For example, the optical fiber may have at least two reflective elements with the same characteristic wavelength which may be separated by a length of optical fiber. Because these reflective optical elements 122 are positioned at different locations along the optical fiber, the interrogation system may most likely be able to distinguish between these elements in time using TDM, even though these elements have the same characteristic wavelength. However, the various characteristic wavelengths need not be repeated the same number of times on the optical fiber or be arranged in any order (e.g., ascending or descending wavelength). In fact, separating reflective optical elements 122 with closely-valued characteristic wavelengths along the optical fiber may offer better distinguishing ability, especially in instances where the optical filter has a wide wavelength passband and the characteristic wavelengths are close together (i.e., have small differences in wavelength). Also, repeated characteristic wavelengths of a reflective sensor element group need not follow the arrangement order of another group.

Example Time Delay Compensation

As described above in FIGS. 1 and 2, certain interrogation techniques use wavelengths sweeps, i.e., a wavelength sweep generated using, for example, a tunable laser or a broadband light source together with an optical tunable filter, to interrogate optical sensors (e.g., reflective optical elements 122). For example, a wavelength sweep may sweep from shorter wavelengths to longer wavelengths, or vice versa, from longer wavelengths to shorter wavelengths. For certain embodiments, the wavelengths may also be varied in a non-linear manner (e.g., sinusoidal). Additionally, different sweep rates may be used at which the wavelength sweep is performed.

As the wavelength sweep is performed, a receiver unit (e.g., receiver 130) may detect reflected optical power from the reflective optical elements 122 (e.g., FBGs). For example, the receiver 130 may detect reflective peaks corresponding to characteristic wavelengths of FBGs.

At the receiver 130, the receiving signal will have traveled a round trip distance of L1+L2, where L1 is the distance from the optical source 110 to the reflective optical element 122 from which the received signal was reflected (e.g., in meters), and where L2 is the distance from the optical element 122 from the which the received signal was reflected to the receiver 130 (e.g., in meters). Therefore, if the refractive index of the optical waveguide is n, the round-trip time for the reflected light to reach the receiver 130 is:

$$t = \frac{(L1 + L2)n}{c}$$

where c is the speed of light in a vacuum (roughly $3 \times 10^8$ m/s). This round-trip time is the time the receiver 130 can expect to receive the reflected optical signal from the interrogation of a particular reflective optical element 122.

For long waveguide lengths (e.g., hundreds of meters or several kilometers of optical fiber), the difference between L1 and L2 may be negligible, such that the round-trip time for a signal from the optical source to a particular optical element and back to the receiver, may be rewritten as $$t=2Ln/c$$

where L is the length from the optical source to the optical element from which the received signal was reflected (e.g., the length of the optical fiber for the particular optical element).

When performing a wavelength sweep to interrogate a plurality of optical elements, the detected wavelength returned from an optical element is always delayed due to this finite round-trip time and may not equal the current scanning wavelength being output (e.g., by the optical source 110) at the time the detected wavelength is received. In other words, there may be a lag between outputting a particular wavelength and receiving reflections at that same wavelength, such that by the time the reflections are received, the optical source may be transmitting light at a different wavelength. Equal to the round-trip time, this lag may be referred to as a time delay ($\Delta t$), such that the detected wavelength returned from an optical element is always delayed by $\Delta t$ relative to the current wavelength according to the sweep (i.e., the wavelength currently being output by the optical source 110).

The time delay ($\Delta t=2Ln/c$) may result in a corresponding wavelength shift ($\Delta\lambda$), as shown in the following equation:

$$\Delta\lambda=v\,\Delta t$$

where v is a velocity of the wavelength scan (e.g., in m/s). The velocity (v) may be positive or negative depending on the direction of the wavelength sweep. As can be seen from the equations above, for large v (i.e., fast sweep speeds) or large L (i.e., long fibers with correspondingly large $\Delta t$), the impact on the measured wavelength, if not properly compensated, causes significant error in the form of wavelength shift.

The speed of the wavelength sweep, the speed of light, and the index of refraction may all be known. However, for long waveguides, the length (L) may be difficult to accurately measure. Therefore, it may be challenging to determine whether measured changes in wavelength ($\lambda$) are a result of shifts in the characteristic wavelength due to changes in the sensed parameter or to shifts in the measured wavelength due to the time delay ($\Delta t$).

In order to avoid the time delay issue, low-speed wavelength sweeps and/or short length waveguides may be used, such that the time delay is small enough that it does not cause a significant wavelength shift and may be either neglected or a rough estimation of waveguide length and index of refraction may be used to determine a compensation value. However, using low-speed wavelength sweeps and/or short length waveguides may be undesirable for certain applications. For example, for faster data updating rate or better measurement resolution, faster wavelength sweep speed may be preferred. Longer waveguide ranges may be desirable in certain applications. In cases where long optical waveguides are used, it may not be practical to obtain waveguide length accurately enough for the time delay compensation.

Therefore, in order to accurately determine the measured characteristic wavelength in cases of fast sweep and/or long waveguide lengths, for example, the time delay ($\Delta t$) (and corresponding wavelength shift $\Delta\lambda$) may be compensated for by using a bidirectional wavelength sweep.

Figure 3:
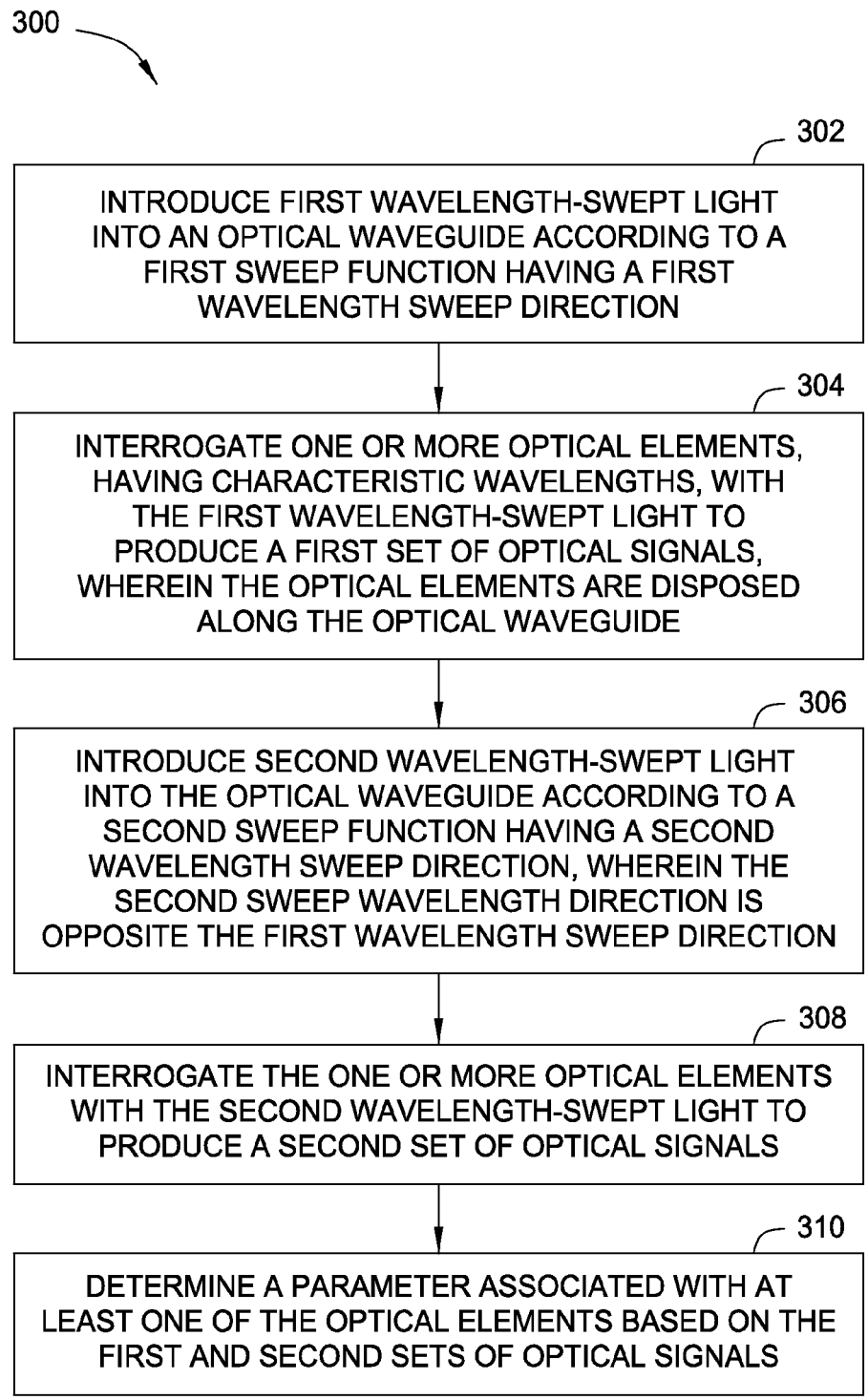
FIG. 3 is a flow diagram of example operations for performing a two-way wavelength sweep to determine a parameter, in accordance with embodiments of the present invention.

FIG. 3 is a flow diagram of example operations 300 for performing a two-way wavelength sweep to determine a parameter, in accordance with embodiments of the present invention.

The operations may begin, at 302, by introducing first wavelength-swept light into an optical waveguide, according to a first sweep function having a first wavelength sweep direction. In some embodiments, the light may be introduced by an optical source which may be, for example, a tunable light source or a broadband light source together with a tunable filter. The optical waveguide may be an optical fiber, or example.

At 304, one or more optical elements having identifiable spectral features (e.g., characteristic wavelengths) may be interrogated with the first wavelength-swept light to produce a first set of optical signals. The optical elements are disposed along the optical waveguide. The optical elements may be disposed at equal or varying distances from one another. Spacing between the optical elements may vary from centimeters to several kilometers (e.g., greater than 10 km). For example, the optical elements may be Bragg gratings, such as fiber Bragg gratings (FBGs), which reflect light at the characteristic wavelengths. In addition or as an alternative to Bragg gratings, the optical elements may include any suitable optical sensors or other optical components having identifiable spectral features, such as Fabry-Perot structures, long period gratings (LPGs), side-hole cane waveguide sensors (e.g., as described in U.S. Pat. No. 8,494,322 to Kersey et al. and available from Weatherford/Lamb, Inc. of Houston, Tex.), and the like.

At 306, second wavelength-swept light may be introduced into the optical waveguide according to a second sweep function having a second wavelength sweep direction. The second wavelength sweep direction is opposite the first wavelength sweep direction. For example, the second sweep function may sweep in increasing wavelength order, while the first sweep function may sweep in decreasing wavelength order.

At 308, the one or more optical elements may be interrogated with the second wavelength-swept light to produce a second set of optical signals. The first and second sets of optical signals may include amplitude peaks at times corresponding to reflections from the optical elements at the characteristic wavelengths.

At 310, a parameter associated with at least one of the optical elements may be determined based on the first and second sets of optical signals. The two sweeps may be performed fast enough such that the time delay ($\Delta t$) of the reflected optical power is the same in both sets of optical signals since the waveguide length L may most likely not change in the time between the two sweeps. Because the sweeps are performed in opposite directions, the time delay results in a shift to a higher wavelength in one direction and to a lower wavelength in the opposite direction—although the amount by which the wavelength is shifted is the same (assuming the sweep rate is the same in both directions). The sweep may also be performed fast enough that the sensed parameter—and also therefore, the characteristic wavelength of each optical element—does not change between the first and second sweeps.

The parameter may be a sensed parameter of the downhole environment (e.g., pressure or temperature) to which the optical elements are sensitive. In the case of FBGs, for example, the characteristic wavelengths (i.e., the wavelengths at which light is reflected back from the FBGs) may shift with a change in temperature or pressure. As such, the sensed parameter may be monitored by monitoring changes in the wavelengths of signals reflected by the optical elements—which may be determined by times at which signals are detected.

Using the two-way sweep, the time delay of the received signals may be determined for each optical element using the pair of optical signals in each direction reflected by that optical element. The following formulation of two equations with two unknowns may be used for each optical element:

$$\lambda = f(t\_up, \Delta t)$$

$$\lambda = g(t\_down, \Delta t)$$

where t_up is the time at which light from the first sweep (e.g., the upscan from shorter to longer wavelengths) reflected from the optical element is received, t_down is the time at which light from the second sweep (e.g., the down scan from longer to shorter wavelengths) reflected from the same optical element is received, $\Delta t$ is the unknown time delay introduced by the finite time the light travels in the waveguide, $\lambda$ is the unknown characteristic wavelength of the optical element, f( ) is the wavelength demodulation algorithm for the first sweep, and g( ) is the wavelength demodulation algorithm for the second sweep.

According to some embodiments, determining the parameter at 310 may involve identifying a first time at which a first optical signal in the first set of optical signals from one of the optical elements is detected; identifying a second time at which a second optical signal in the second set of optical signals from the one of the optical elements is detected; calculating at least one of a time delay or a wavelength (the time delay or the wavelength being associated with the one of the optical elements) based on the first and second times; and determining the parameter based on the calculated time delay or wavelength. For some embodiments, calculating the at least one of the time delay or the wavelength includes solving first and second equations, wherein in the first equation the wavelength equals a first wavelength function of the time delay and the first time (e.g., a difference between the first time and the time delay), and wherein in the second equation the wavelength equals a second wavelength function of the time delay and the second time (e.g., a difference between the second time and the time delay). For some embodiments, determining the parameter based on the calculated time delay or wavelength entails identifying the parameter based on the wavelength calculated from the first and second equations. At least one of the first and second wavelength functions may be a wavelength demodulation algorithm. For some embodiments, the time delay is attributable to the first or second wavelength-swept light traveling from an optical source via the optical waveguide, to the one of the optical elements, and back to an optical receiver.

According to some embodiments, the first sweep function and the second sweep function are performed at a sweep rate such that the parameter does not change significantly between performing the first sweep function and performing the second sweep function. For some embodiments, the first wavelength sweep direction proceeds from relatively shorter wavelengths to longer wavelengths, and the second wavelength sweep direction proceeds from the longer wavelengths to the shorter wavelengths. For other embodiments, the first wavelength sweep direction proceeds from relatively longer wavelengths to shorter wavelengths, and the second wavelength sweep direction proceeds from the shorter wavelengths to the longer wavelengths.

According to some embodiments, the first sweep function and the second sweep function have a constant sweep rate. For some embodiments, the first and second sweep functions are linear functions, whereas in other embodiments, the first and second sweep functions are nonlinear functions. For example, the first and second sweep functions may be sinusoidal functions.

According to some embodiments, the parameter determined at 310 may be the time delay or the characteristic wavelength of at least one of the optical elements. The time delay or the characteristic wavelength may be a useful quantity for certain applications.

Figure 4:
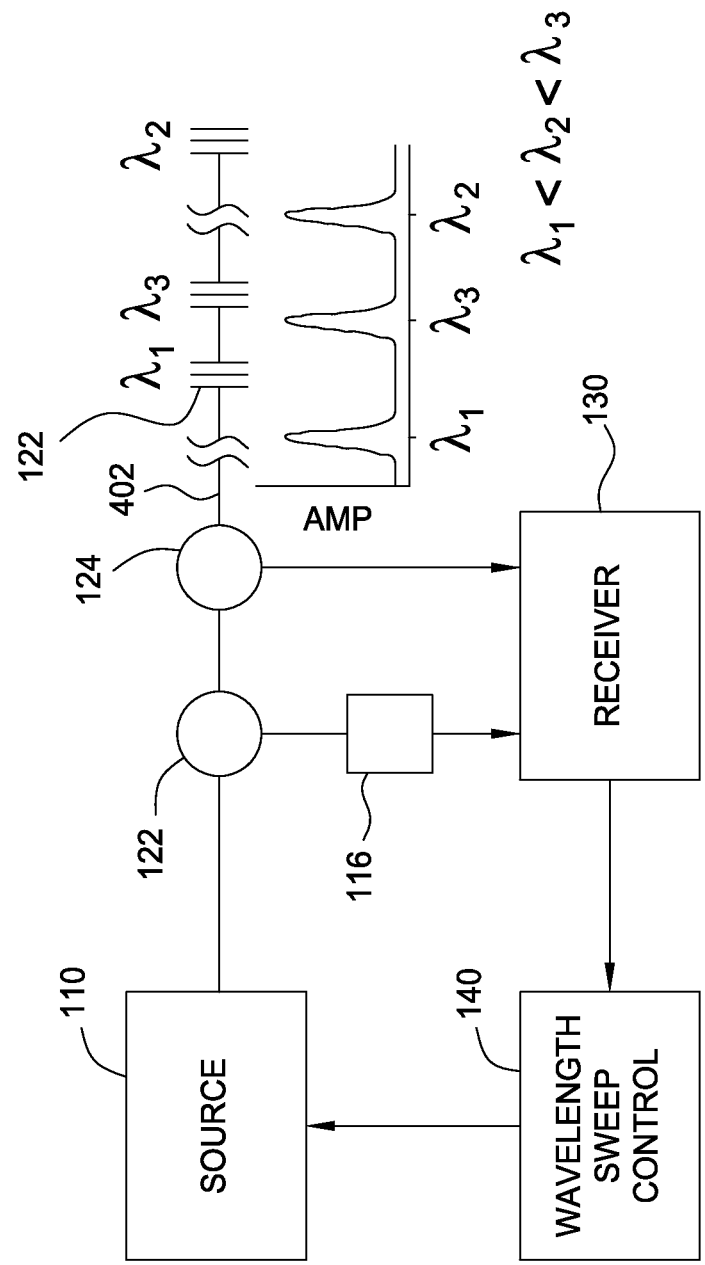
FIG. 4 is a block diagram illustrating an example interrogation system for performing a two-way wavelength sweep to determine a time delay, in accordance with embodiments of the present invention.

FIG. 4 is a block diagram illustrating the example interrogation system of FIG. 1 with an FBG 2, having a characteristic wavelength $\lambda\_2$ spaced at a relatively long distance on an optical fiber 402 from FBGs 1 and 3 (having characteristic wavelengths $\lambda\_1$ and $\lambda\_3$, respectively). Although FBGs are illustrated in the example system of FIG. 4, other suitable optical elements having identifiable spectral features may be used, as described above. As shown in FIG. 4, FBGs 1 and 3 may be located relatively close to one another on the fiber 402. However, FBG 2 may be located along the fiber 402 a relatively long distance from FBGs 1 and 3. For example, there may be 10 km of optical fiber between FBG 3 and FBG 2. In this case, the time delay introduced by light traveling 10 km to the FBG 2 and 10 km returning to the receiver 130 may create a significant error in the form of a wavelength shift ($\Delta \lambda$), as shown in FIG. 5.

Figure 5:
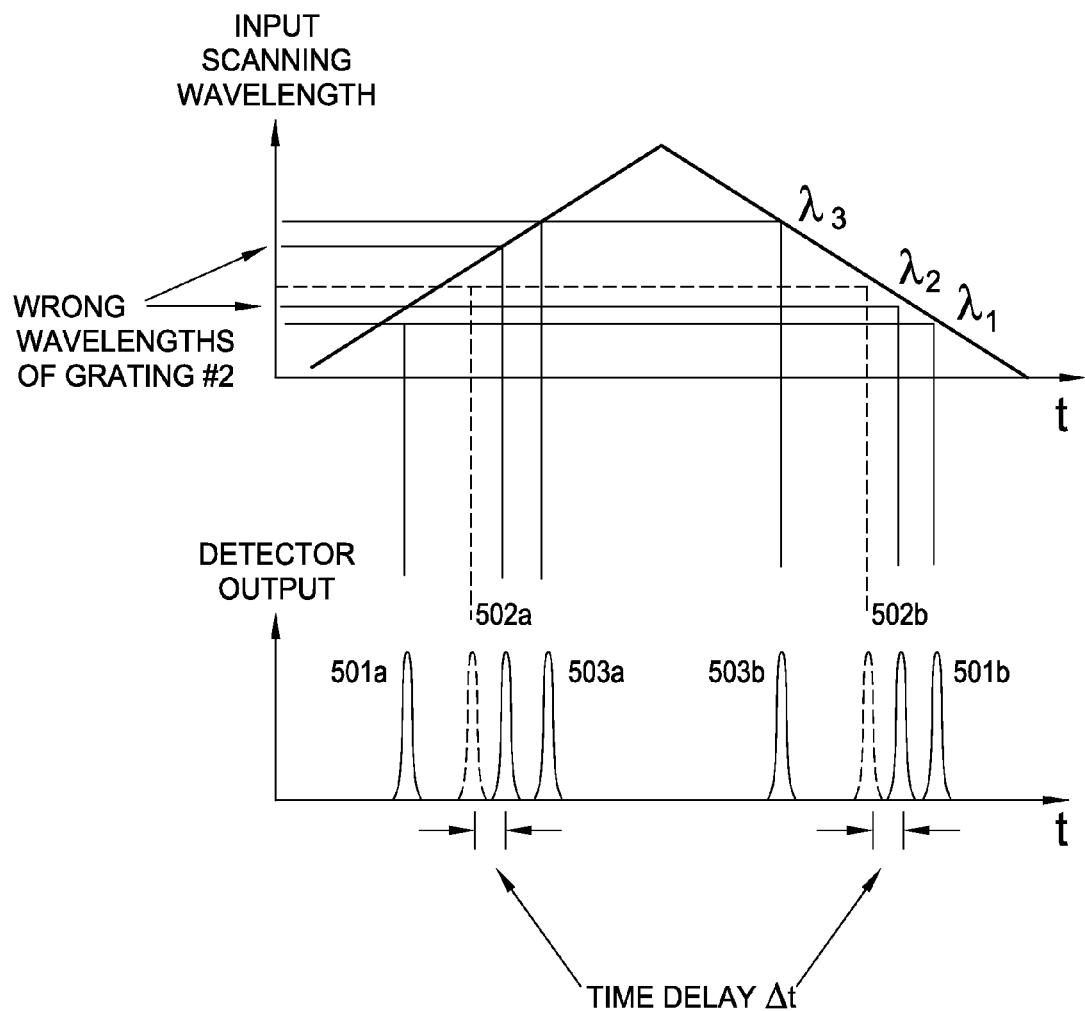
FIG. 5 illustrates a time delay in a received signal from a two-way wavelength sweep performed by an interrogation system, in accordance with embodiments of the present invention.

FIG. 5 illustrates a time delay in a received signal from a two-way wavelength sweep performed by an interrogation system, such as the interrogation system shown in FIG. 4, in accordance with embodiments of the present invention. As shown in FIG. 5, the dashed waveforms show the expected received signals relative to the wavelength sweeps. As shown, however, signal 502*a* (received from FBG 2) experiences a time delay ($\Delta t$) relative to the dashed waveform due to travel in the fiber 402, corresponding to a wavelength shift ($\Delta \lambda$), closer to $\lambda\_1$ in a first sweep, but closer to $\lambda\_3$ in a second reverse sweep.

However, as also shown in FIG. 5, the time delay ($\Delta t$) should be the same in both sweep directions. Therefore, by performing the two-way wavelength sweep, a system of two equations may be set up accounting for $\Delta t$ to compensate the reception times of the received signals and accurately determine the wavelength. $\Delta t$ is one unknown, and the wavelength of the received signal is the second unknown. Because the sweep may be performed fast enough such that the wavelength does not change between sweeps, the wavelength in the two equations may be equal, and the equations may therefore be solved to determine $\Delta t$ and $\lambda$.

Figure 6:
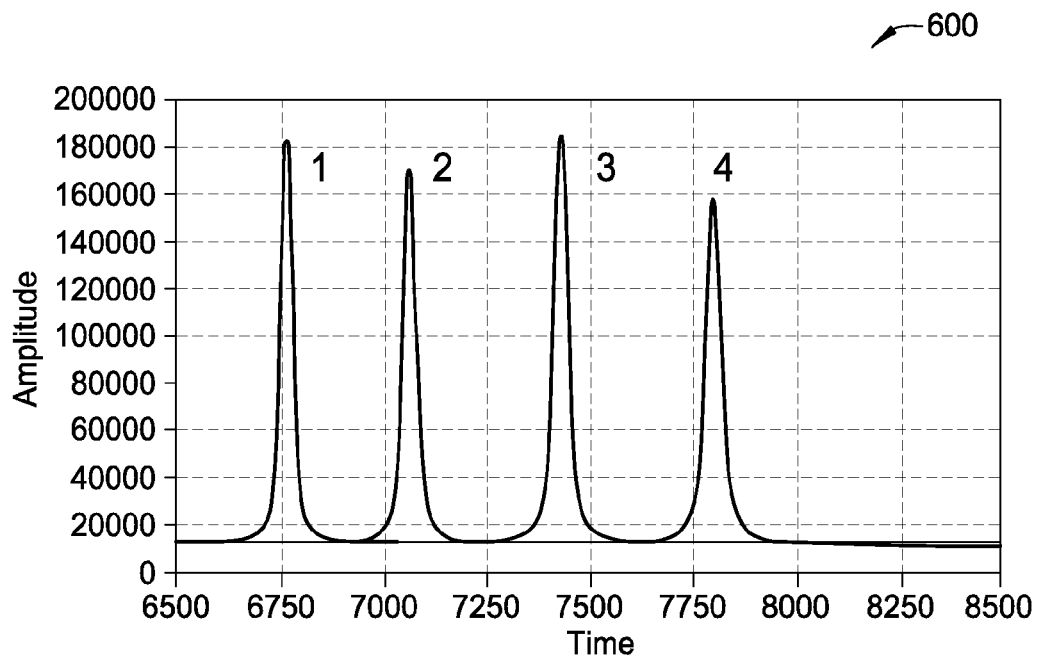
FIG. 6 illustrates an example received signal showing times at which reflected signals from a one-way sweep of four fiber Bragg gratings (FBGs) on a relatively short optical fiber are detected, in accordance with embodiments of the present invention.

FIG. 6 illustrates an example plot 600 of a received signal showing times at which reflection peaks from a one-way sweep of four FBGs on a relatively short fiber (<<1 km) are detected, in accordance with embodiments of the present invention. In the example shown in FIG. 6, peaks of optical power are detected in a signal received from four FBGs 1, 2, 3, and 4, the FBGs being interrogated with a 100 Hz wavelength sweep and separated by about 80 nm peak-to-peak. The FBGs are located a relatively short distance (e.g., <1 km) from the source and receiver such that any time delay may be negligible. In the example shown in FIG. 6, the measured wavelength difference between FBGs 2 and 3 is 1.7934 nm.

Figure 7:
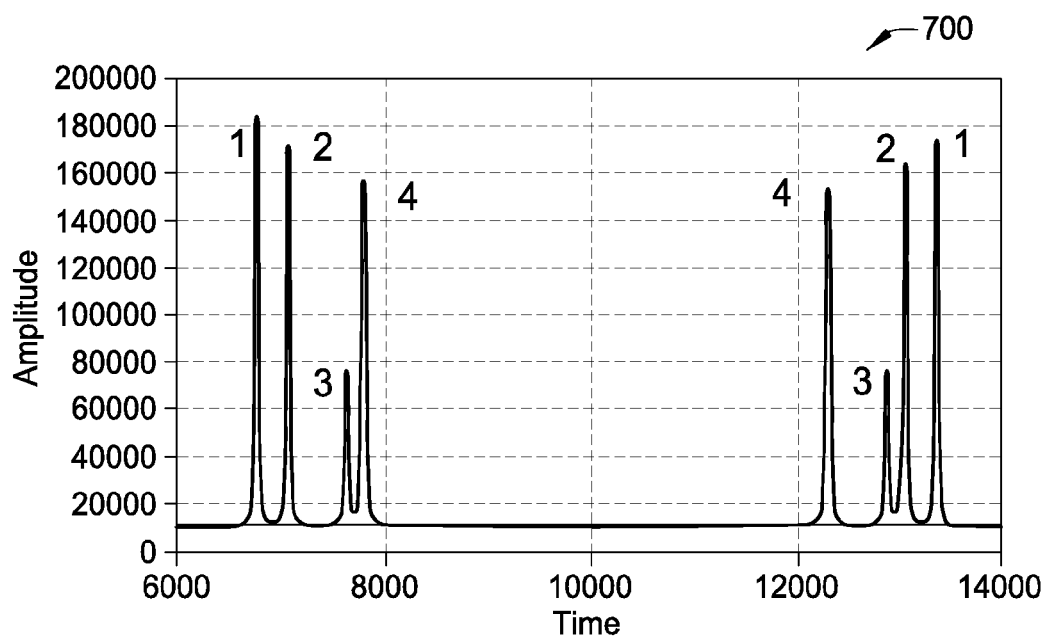
FIG. 7 illustrates an example received signal showing times at which reflected signals from a two-way sweep of four FBGs are detected with a relatively long fiber are detected, in accordance with embodiments of the present invention.

FIG. 7 illustrates an example plot 700 of a received signal showing times at which reflection peaks from a two-way sweep of four FBGs are detected with a 10.2 km fiber for FBG 3, in accordance with embodiments of the present invention. In the example shown in FIG. 7, four FBGs 1, 2, 3, and 4 may be interrogated with a 100 Hz wavelength sweep and have characteristic wavelengths separated by about 80 nm peak-to-peak, the same as shown in FIG. 6. However, in the example shown in FIG. 7, FBG 3 may be located about 10.2 km from the other FBGs, thus introducing a time delay and corresponding wavelength shift in the light detected from FBG 3. As seen in FIG. 7, the reflected signal from FBG 3 is received with a time delay, closer to FBG 4 in the first sweep and closer to FBG 2 in the second sweep in the reverse direction. In this case, the measured wavelength difference is 1.7926 nm. Because a two-way sweep is performed, the time delay can be calculated as 99.374 µs, corresponding to a length of 10.146 km and refractive index of 1.4681 in a single-mode fiber.

Using a two-way direction wavelength sweep may enable wavelength shift in-situ introduced by light travelling a length of optical waveguide to be automatically compensated. Therefore, any errors caused by inaccurate estimation of waveguide length may be eliminated. High wavelength sweep speeds and/or long waveguide lengths may be used without loss in wavelength measurement accuracy. This may be useful in a situation where the waveguide length changes due to system upgrading or when waveguide refractive index increases over time (e.g., in the presence of hydrogen).

Any of the operations described above, such as the operations 300, may be included as instructions in a computer-readable medium for execution by the receiver 130 or any other processor. The computer-readable medium may comprise any suitable memory for storing instructions, such as read-only memory (ROM), random access memory (RAM), flash memory, an electrically erasable programmable ROM (EEPROM), a compact disc ROM (CD-ROM), or a floppy disk.

While the foregoing is directed to embodiments of the present invention, other and further embodiments of the invention may be devised without departing from the basic scope thereof, and the scope thereof is determined by the claims that follow.

What is claimed is:

1. A method for optical interrogation, comprising:
   introducing first wavelength-swept light into an optical waveguide according to a first sweep function having a first wavelength sweep direction;
   interrogating one or more optical elements, having characteristic wavelengths, with the first wavelength-swept light to produce a first set of optical signals, wherein the optical elements are disposed along the optical waveguide;
   introducing second wavelength-swept light into the optical waveguide according to a second sweep function having a second wavelength sweep direction, wherein the second wavelength sweep direction proceeds from relatively longer wavelengths to shorter wavelengths and is opposite the first wavelength sweep direction;
   interrogating the one or more optical elements with the second wavelength-swept light to produce a second set of optical signals; and
   determining a parameter associated with at least one of the optical elements based on the first and second sets of optical signals.

2. The method of claim 1, wherein determining the parameter comprises:
   identifying a first time at which a first optical signal in the first set of optical signals from one of the optical elements is detected;
   identifying a second time at which a second optical signal in the second set of optical signals from the one of the optical elements is detected;
   calculating at least one of a time delay or a wavelength, associated with the one of the optical elements, based on the first and second times; and
   determining the parameter based on the calculated time delay or wavelength.

3. The method of claim 2, wherein calculating the at least one of the time delay or the wavelength comprises solving first and second equations, wherein in the first equation the wavelength equals a first function of the time delay and the first time, and wherein in the second equation the wavelength equals a second function of the time delay and the second time.

4. The method of claim 3, wherein determining the parameter based on the calculated time delay comprises identifying the parameter based on the wavelength calculated from the first and second equations.

5. The method of claim 3, wherein at least one of the first and second functions comprises a wavelength demodulation algorithm.

6. The method of claim 2, wherein the time delay is attributable to the first or second wavelength-swept light traveling from an optical source via the optical waveguide, to the one of the optical elements, and back to an optical receiver.

7. The method of claim 1, wherein the first sweep function and the second sweep function are performed at a sweep rate such that the parameter does not change significantly between performing the first sweep function and performing the second sweep function.

8. The method of claim 1, wherein the first sweep function and the second sweep function comprise a constant sweep rate.

9. The method of claim 1, wherein the first wavelength sweep direction proceeds from the shorter wavelengths to the longer wavelengths.

10. The method of claim 1, wherein the first and second sweep functions comprise linear functions.

11. The method of claim 1, wherein the first and second sweep functions comprise sinusoidal functions.

12. The method of claim 1, wherein the parameter comprises at least one of a temperature or a pressure.

13. An apparatus for optical interrogation, comprising:
   an optical waveguide;
   one or more optical elements disposed along the optical waveguide, the optical elements having characteristic wavelengths;
   an optical source configured to:
     introduce first wavelength-swept light into the optical waveguide according to a first sweep function having a first wavelength sweep direction to interrogate the one or more optical elements to produce a first set of optical signals; and
     introduce second wavelength-swept light into the optical waveguide according to a second sweep function having a second wavelength sweep direction to interrogate the one or more optical elements to produce a second set of optical signals, wherein the second wavelength sweep direction proceeds from relatively shorter wavelengths to longer wavelengths and is opposite the first wavelength sweep direction; and
   at least one processor configured to determine a parameter associated with at least one of the optical elements based on the first and second sets of optical signals.

14. The apparatus of claim 13, wherein the at least one processor is configured to determine the parameter by:
   identifying a first time at which a first optical signal in the first set of optical signals from one of the optical elements is detected;
   identifying a second time at which a second optical signal in the second set of optical signals from the one of the optical elements is detected;
   calculating at least one of a time delay or a wavelength, associated with the one of the optical elements, based on the first and second times; and
   determining the parameter based on the calculated time delay or wavelength.

15. The apparatus of claim 14, wherein calculating the at least one of the time delay or the wavelength comprises solving first and second equations, wherein in the first equation the wavelength equals a first function of the time delay and the first time, and wherein in the second equation the wavelength equals a second function of the time delay and the second time.

16. The apparatus of claim 15, wherein determining the parameter based on the calculated time delay comprises identifying the parameter based on the wavelength calculated from the first and second equations.

17. The apparatus of claim 15, wherein at least one of the first and second functions comprises a wavelength demodulation algorithm.

18. The apparatus of claim 14, wherein the time delay is attributable to the first or second wavelength-swept light traveling from the optical source via the optical waveguide, to the one of the optical elements, and back to an optical receiver.

19. The apparatus of claim 13, wherein the first sweep function and the second sweep function are performed at a sweep rate such that the parameter does not change significantly between performing the first sweep function and performing the second sweep function.

20. The apparatus of claim 13, wherein the one or more optical elements comprise at least one of fiber Bragg gratings (FBGs), long period gratings (LPGs), Fabry-Perot structures, or side-hole cane waveguide sensors.

21. The apparatus of claim 13, wherein the first sweep function and the second sweep function comprise a constant sweep rate.

22. The apparatus of claim 13, wherein the first wavelength sweep direction proceeds from the longer wavelengths to the shorter wavelengths.

23. The apparatus of claim 13, wherein the first and second sweep functions comprise nonlinear functions.

24. The apparatus of claim 13, wherein the first and second sweep functions comprise sinusoidal functions.

25. The apparatus of claim 13, wherein the parameter comprises at least one of a temperature or a pressure.

26. A computer program product, comprising a computer-readable storage device having instructions executable to:
   introduce first wavelength-swept light into an optical waveguide according to a first sweep function having a first wavelength sweep direction;
   interrogate one or more optical elements, having characteristic wavelengths, with the first wavelength-swept light to produce a first set of optical signals, wherein the optical elements are disposed along the optical waveguide;
   introduce second wavelength-swept light into the optical waveguide according to a second sweep function having a second wavelength sweep direction, wherein the second wavelength sweep direction proceeds from relatively longer wavelengths to shorter wavelengths and is opposite the first wavelength sweep direction;
   interrogate the one or more optical elements with the second wavelength-swept light to produce a second set of optical signals; and
   determine a parameter associated with at least one of the optical elements based on the first and second sets of optical signals.

\* \* \* \* \*